E. A. SPERRY.
TRENCH SEARCHLIGHT.
APPLICATION FILED APR. 3, 1917.

1,403,876

Patented Jan. 17, 1922
3 SHEETS—SHEET 1.

INVENTOR
ELMER A. SPERRY.
BY
Herbert H. Thompson
ATTORNEY

E. A. SPERRY.
TRENCH SEARCHLIGHT.
APPLICATION FILED APR. 3, 1917.
1,403,876.
Patented Jan. 17, 1922.
3 SHEETS—SHEET 2.
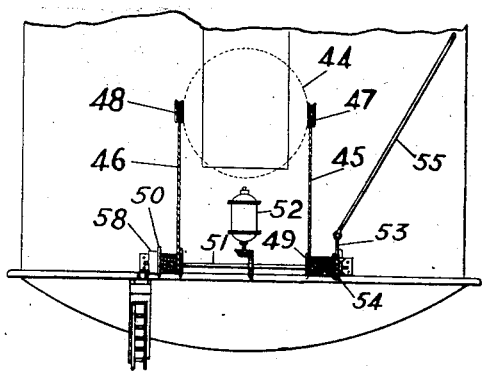
Fig. 2.
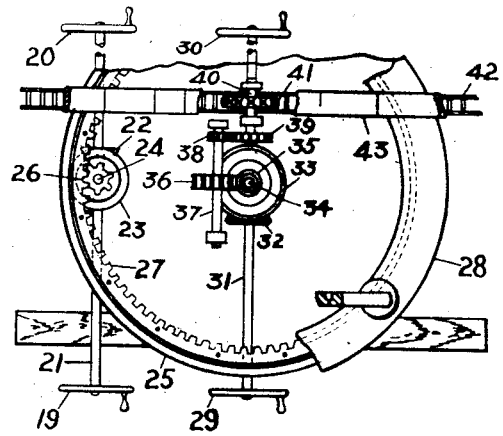
Fig. 6.
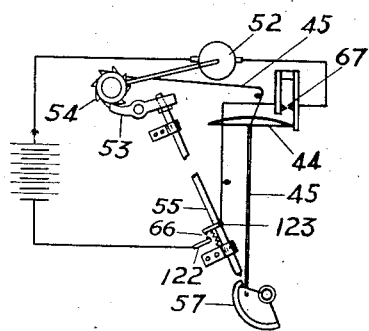
Fig. 3.
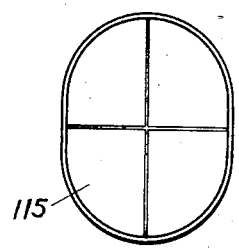
Fig. 9.
Fig. 10
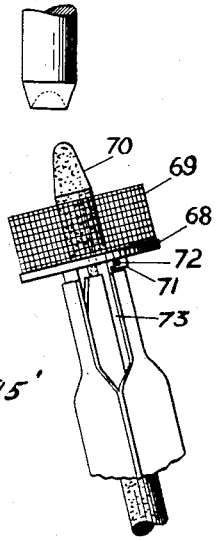
Fig. 5.
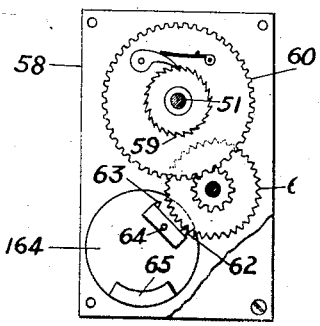
Fig. 4.
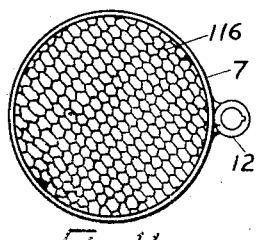
Fig. 11.
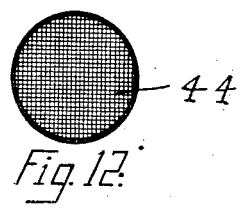
Fig. 12.
INVENTOR
ELMER A. SPERRY.
BY
Herbert H. Thompson
ATTORNEY

E. A. SPERRY.
TRENCH SEARCHLIGHT.
APPLICATION FILED APR. 3, 1917.

1,403,876.

Patented Jan. 17, 1922.
3 SHEETS—SHEET 3.

INVENTOR
ELMER. A. SPERRY.
BY
Herbert H. Thompson
ATTORNEY

UNITED STATES PATENT OFFICE.

ELMER A. SPERRY, OF BROOKLYN, NEW YORK.

TRENCH SEARCHLIGHT.

1,403,876.  Specification of Letters Patent.  Patented Jan. 17, 1922.

Application filed April 3, 1917. Serial No. 159,396.

*To all whom it may concern:*

Be it known that I, ELMER A. SPERRY, a citizen of the United States of America, residing at 1505 Albermarle Road, Brooklyn, in the county of Kings and State of New York, have invented certain new and useful Improvements in Trench Searchlights, of which the following is a specification.

This invention relates to searchlights for use on battle fields, either to illuminate the field itself or the sky above it.

The object of the invention is to devise a searchlight of the type disclosed in my copending application, Serial No. 99,715, filed May 25, 1916, which may be operated from a position immune or substantially immune from enemy gunfire, and which may, when necessary, be operated at high angles for detecting air craft or for other purposes, without subjecting the projector to injury by hot particles which occasionally fall from the arc.

Referring to the drawings in which what I now consider to be the preferred forms of my invention are shown Fig. 1 is an elevation of a searchlight constructed according to my invention.

Fig. 2 is a side elevation of mechanism for controlling a pan for catching hot particles falling from the arc.

Fig. 3 is a diagrammatic view of said mechanism.

Fig. 4 is a detail of the mechanism.

Fig. 5 is a detailed view of a cup for catching hot material falling from the negative carbon.

Fig. 6 is a section taken on line 6—6, Fig. 1 showing the means for turning the searchlight.

Fig. 9 is a view of the form of reflector which may be used in my device.

Fig. 10 is a similar view of a modified form of reflector.

Fig. 11 is a detail plan view of one form of shield which is employed for protecting the searchlight.

Fig. 12 is a detail view of one form of catch pan.

Figure 1:
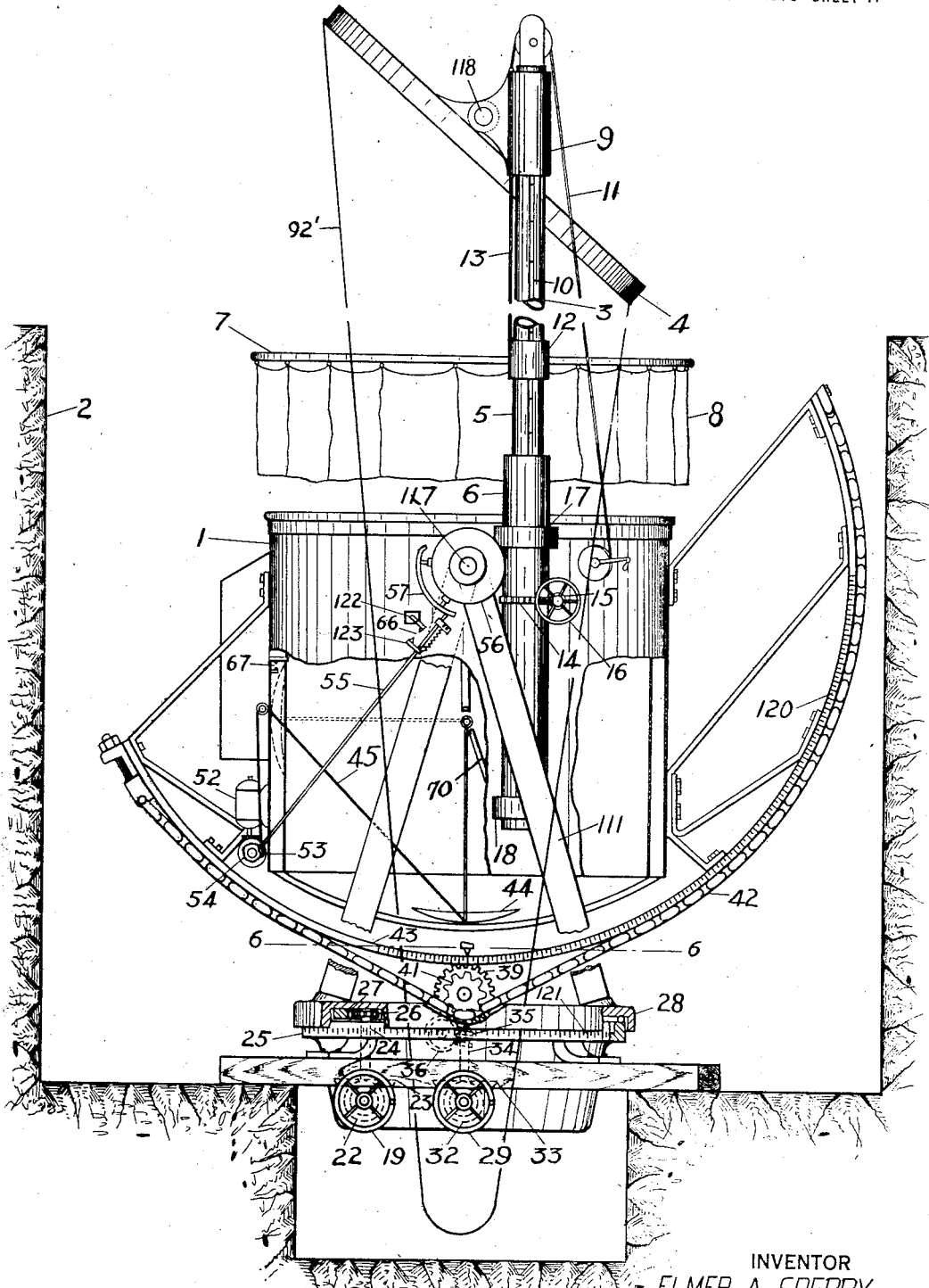

According to my invention, I design the searchlight 1 so that it may be operated from a position entirely below the ground in a sheltered pit 2 or behind a parapet or the like. The searchlight may be mounted in a normally vertical position, so that the beam is projected vertically. Positioned above the lamp on a post or mast 3 is a reflector or mirror 4, preferably inclined at an angle to the vertical, so that the reflected beam will be approximately horizontal. The mast is preferably made of a plurality of sections 5 and 6 so that it may readily be dismantled.

The mirror 4 may be of the usual material and if desired may be made in sections as shown in Fig. 9, so that the breaking of one of the sections 115 need not affect the others. Or it may be made of polished metal, so as not to be damaged to any great extent by small bullets and fragments of shells. Preferably I use a mirror 115 of glass reinforced by wire netting as shown in Fig. 10, as the glass may be shattered considerably and still serve reasonably well. In order to prevent broken pieces of the mirror from falling upon the glass front of the searchlight, I may provide a wire netting screen 116 stretched across a hoop 7 beneath the mirror as shown in Fig. 11. Hanging from hoop 7 is also provided an opaque screen 8 to conceal the beam rising from the searchlight, and thus render it more difficult to locate the source of the light.

The mirror 4 is shown fastened to member 9 fitting slidably over mast 3 and guide strip 10 thereon, and may be raised or lowered by means of cable 11. Hoop 7 fastened to member 12 slidably fitting over the mast, may be connected by any suitable means 13 to the mirror, so that screen 8 and the mirror may be raised and lowered together.

The direction of the beam reflected from mirror 4 may be controlled by revolving or tilting the searchlight drum, while the mirror and mast being secured to the drum by brackets 17 and 18 will continue to bear the same relation thereto. The drum is pivotally supported at 117 by legs 111 on the revolving portion of the base 28; the major portion of the drum being on the opposite side of the pivot to the mast so that each may counterbalance the other. I may also provide a chain or cord 92' on mirror 4, so that the mirror may be tilted separately on pivot 118 if desired, for slight changes in elevation of the beam.

The drum may be revolved by turning hand wheels 19 or 20 (Figs. 1 and 6) on shaft 21, on which is also mounted a beveled gear 22 meshing with another beveled gear 23 on shaft 24. Shaft 24 which has its bearing in the stationary part 25 of the base carries a pinion 26 meshing with an internal, annular gearing 27 on the revolvable part 28 of the base upon which is mounted the drum. The drum may be tilted by turning wheels 29 or 30 on shaft 31, on which is a bevel gear 32 meshing with another bevel gear 33 on shaft 34. Said shaft is provided with a worm 35 meshing with worm wheel 36 on shaft 37 provided with pinion 38. Pinion 38 through gear 39 on shaft 40 turns sprocket gear 41. The drum 1 is provided with a sprocket chain 42, over guide 43, meshing with sprocket gear 41. Any movement of the drum carries with it the mats and mirror.

For indicating the number of degrees through which the drum is turned, I may provide scales 120 and 121.

When using the light for anti-air-craft purposes, if the aircraft is low or distant the mirror 4 may be used, but when the aircraft is high or overhead the mirror may be swung out of the path of the beam and the light pointed directly at the object. To swing the mirror out of the path of the beam, I may provide, fastened to and extending part way around the mast, gearing 14, meshing with a worm 15 which may be turned by the turning of wheel 16. This will cause the mast to revolve in its brackets 17 and 18.

When the searchlight is pointing upwardly, the reflector within the drum is, of course, under the arc. It therefore becomes necessary to protect this reflector from hot particles which occasionally fall from the arc and fuse into the polished surface of the reflector. For this purpose I prefer to employ a shield or pan 44 which may be pivotally supported so as to hang vertically under the arc. The pan may be made of mica or similar transparent material. Preferably it is made of openwork metal, such as fine wire gauze or screen as shown in Fig. 12, so that a minimum amount of light may be shut off thereby. The mesh of the screen should be such as will check the passage of the smallest particles that are capable of causing damage. The diameter of the wire used in the screen should be sufficient to conduct heat away from a very hot particle fast enough to prevent the wire itself from fusing and allowing the particle to fall through upon the reflector.

I prefer to provide automatic controlling means whereby the pan may be withdrawn from the zone of light when the drum is horizontal or nearly horizontal, and for returning it to its operating position when the drum is tilted beyond a predetermined angle. To this end I may provide one or more flexible wires 45 and 46 fastened at one end to the pan and passing through the top of the drum, over pulleys 47 and 48, to drums 49 and 50. These drums are on shaft 51 and are wound up by motor 52 and held in this position by pawl 53 and ratchet 54. A rod 55 on the outside of the searchlight drum is connected at one end to the pawl for tripping the latter. Attached to the stationary part 56 of the frame in which the searchlight is pivoted, is a cam 57 stationed in the path of rod 55. When the light is tilted to about 30° above the horizontal, rod 55 engages cam 57 and is thereby raised, tripping pawl 53 and releasing ratchet 54 so that the pan becomes free to fall into place below the arc.

I desire also to provide means for letting the pan down gently, rather than allow it to fall. For this purpose I may employ a retarding device 58 (Figs. 2 and 4). A ratchet wheel 59 is rigidly mounted on shaft 51 while gear 60 is loosely mounted thereon. It will be seen that the shaft will be free to turn in one direction without turning the whole train of gears in 58, while, in order to turn in the other direction it must turn the whole train of gears including the star wheel 61 which must alternately engage and disengage points 62 and 63 rigidly attached to wheel 164; said wheel being pivoted at 64 and carrying a weight 65. The instrument is so attached to shaft 51 as to retard the downward movement of the pan, and to remain inactive when the pan is being raised.

It will be seen in connection with Fig. 1 and the wiring diagram in Fig. 3 that when the searchlight is in a tilted position anywhere above 30° from horizontal, rod 55 will be held in an outwardly pressed position, allowing the pan 44 to hang pendulously, and to swing freely so as to always be directly under the arc. In this position a contact 66, one point 122 of which is located on the drum, and the other point 123 on the rod 55 remains open. But when the light is returned toward the horizontal far enough to allow rod 55 to slip off from cam 57, contact 66 becomes closed. Contact 67 stationed in the top of the drum is always closed when the pan is down, so that now a circuit is completed through motor 52, and the pan is drawn up to the top of the searchlight drum, out of the zone of light. When it reaches this position it strikes and opens contact 67, and the winding up mechanism stops working. The pan is held up and against contact 67 by pawl and ratchet 53 and 54, until rod 55 is again pressed outwardly.

While the pan serves to catch all harmful particles falling from the arc, when it is constructed of metal gauze it is unable to catch the drippings of molten copper from the negative electrode, as these drippings falling through such a distance break up and splash through to the mirror. This may be overcome by placing a small cup close to the source of these drippings. Such an arrangement is shown in Fig. 5. The cup is preferably made of a solid metal disc bottom 68 with sides 69 of fine metal gauze. A hole is provided in the bottom of the cup, to fit over the electrode 70. On the bottom of the cup are one or more hooks 71, to fit over one or more small pins 72 in the carbon holder 73. When the light is in a vertical or nearly vertical position, the molten copper will fall into the bottom of the cup, but when the light is at a lower angle, the drippings will fall against the sides of the cup. Not having fallen very far, these drippings do not break up and splash around, but trickle down the sides into the bottom of the cup.

The cup may be made of copper, in which case I prefer to plate it with a non-oxidizing metal, such as nickel or silver.

The searchlight as shown in Fig. 1 is designed so that it may also be used as a truck light, that is, it may be mounted and operated on a military truck or train. When so used, the mast and mirror 4 may be removed and the light pointed directly at the object horizontally or vertically. Preferably, however, the mast and mirror are used even when the light is used as a truck searchlight. Ordinarily a truck searchlight is mounted on a mast so as to raise the source of light to an advantageous height. By placing the mirror above the truck, I am able to place the light, which is very heavy, on the truck, and obtain all the advantages of an elevated source of light, and at the same time, overcome the disadvantage of raising the entire searchlight to the desired height.

Figure 7:
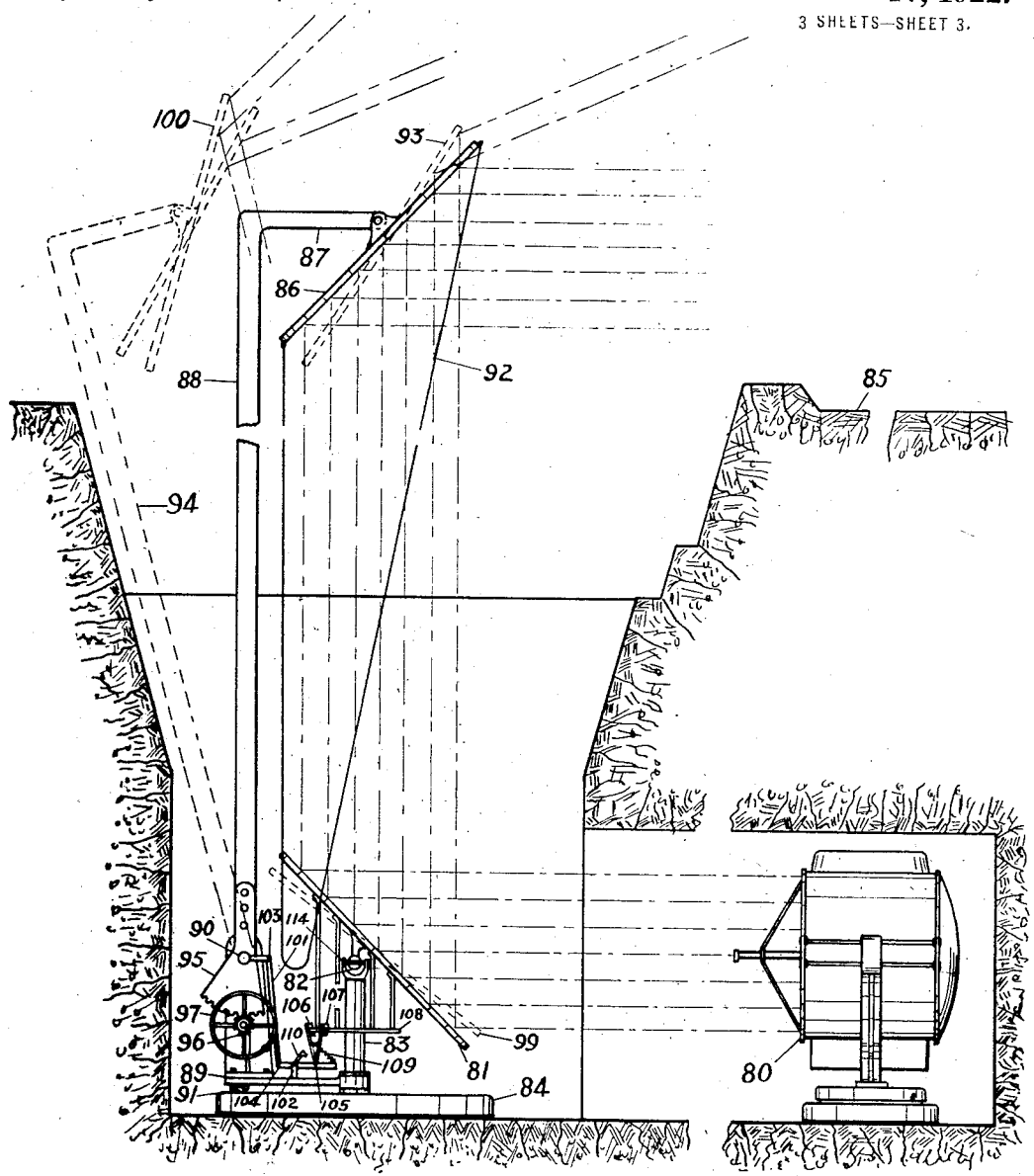
Fig. 7 is a modification of the invention showing the searchlight in a different position affording even greater security.

As one of the objects of the invention is to provide a searchlight for use in trench warfare, which will be safe from enemy gunfire, I have shown in Fig. 7 a modification, in which the searchlight 80 may be placed entirely under ground away from the rain of shrapnel, and still be capable of projecting a beam in any direction above the ground. Directly in the path of the beam I provide a reflector 81 pivoted by a universal joint 82 to post 83 which is rigidly mounted on a base 84. Above the surface 85 of the ground I provide a second reflector 86 pivotally supported on arm 87 extending from mast 88. Mast 88 is pivotally fastened to bracket 89 at 90. Bracket 89 is pivotally fastened to post 83 and provided with rollers 91 resting on base 84.

By turning bracket 89 and mast 88 around post 83, it will readily be seen that the beam may be projected in any direction in azimuth, while by tilting reflector 86 by any suitable means, such as a chain or cord 92, the beam may be raised or lowered. After tilting the mirror to, say the dotted line position 93, the mast may be leaned backwardly as shown in the dotted line position 94 for higher elevations of the beam.

For leaning the mast backward I may provide a segmental gear 95 secured to the bottom of the mast, and meshing with pinion 96 on bracket 89 and operated by hand wheel 97.

When leaning the mast backward it becomes necessary to tilt reflector 81 as shown by the dotted line position 99 so that the beam may still strike mirror 86. This adjustment may be made manually, but is preferably effected automatically by means of levers 101, rigidly fastened to mast 88 and pivotally secured to bracket 89 at 102. The several links of levers 101 are pivotally secured to each other at 103, 104, and 105. Members 106 and 107 of said levers are adapted to engage a ring 108 rigidly suspended from mirror 81. It will readily be seen that when the mast is tilted backward, mirror 81 will follow, thus keeping the beam projected against mirror 86. When the mast is swung around post 83 it will carry levers 101 also, so that the leaning of the mast from any position around mirror 81 will automatically effect the necessary change of said mirror.

After tilting mirror 86 to, say the dotted line position 100, higher angles may be effected by projecting the beam directly from mirror 81.

A spring 109 may be provided to hold members 106 and 107 normally in contact with ring 108, and a hook 110 may be provided to hold said members disengaged from said ring when mirror 81 is being used independently of mirror 86.

Figure 8:
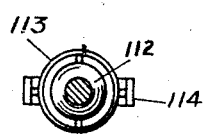
Fig. 8 is a detail showing a universal joint used on one of the mirrors.

In order to prevent mirror 81 from revolving in azimuth through universal joint 82, I prefer to construct said joint as shown in Fig. 8 in which 112 is a ball attached to the mirror. This ball is pivotally secured to gimbal ring 113, which is in turn pivotally secured to the forked members 114 on the post 83.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a searchlight including a projector and a source of light, a projector shield adapted to be raised and lowered within said searchlight, means supporting said shield in raised position, means for moving the searchlight about a horizontal axis, and means controlled by the position of the searchlight for lowering the shield into its operative position.

2. In a searchlight including a projector and a source of light, a projector shield located between said light source and said projector, means supporting said shield for pivotal movement about an axis at a distance from the shield, means for moving said searchlight in elevation, and means controlled by the position of the searchlight for removing said shield from its operative position.

3. In a searchlight including a projector and a source of light, a projector shield within said searchlight, means for raising said shield to inoperative position, means for moving said searchlight in elevation, and means responsive to a predetermined elevation of the searchlight for releasing said shield from its raised position.

4. In a searchlight including a projector and a source of light, a projector shield located between said light source and said projector, means for moving said searchlight in elevation, and means responsive to the lowering of the searchlight to a predetermined position for removing said shield from the zone of light.

5. In a searchlight including a projector and a source of light, a projector shield located between the projector and the light source, means for raising said shield to a point without the light beam, means for moving the searchlight, and means controlled by the movement of the searchlight for releasing said shield from its raised position.

6. In a searchlight including a projector and a source of light, a projector shield located between said projector and said source of light, means for moving the searchlight, means responsive to a certain position of the searchlight for removing said shield from said location to a location without the light beam and means for holding said shield in an inoperative position.

7. A military searchlight comprising a drum supported on a horizontal axis in a vertical position, a reflector, an adjustable means for supporting said reflector aloft and means for concealing the light beam between said drum and said reflector.

8. The combination with a normally vertical searchlight, of a mast mounted adjacent said light, a reflector supported on said mast and means for revolving said mast to turn said reflector without the beam of light.

9. A searchlight, including a drum rotatable about an axis and a base therefor, means for tilting said drum about said axis comprising a plurality of gears located on said base, a sprocket chain located on said drum engaging one of said gears and means for turning said gears.

10. A searchlight, including a drum rotatable about an axis and a base therefor, means for tilting said drum about said axis comprising a plurality of gears located on said base, a sprocket chain located on said drum engaging one of said gears, means for turning said gears, and means for turning said drum in azimuth.

11. In combination, a searchlight, a catch-pan therefor movable by gravity to a predetermined position, means for holding said catch-pan in inoperative position, means controlled by the position of the searchlight for releasing the catch-pan to the action of gravity, and means for retarding the movement of said catch-pan to said predetermined position.

12. In combination, a searchlight adapted to be directed upwardly, a reflector, means including a mast for supporting said reflector above said searchlight, means supported on said mast for concealing the beam of said light between said searchlight and reflector and means for raising and lowering said last named means.

In testimony whereof I have affixed my signature.

ELMER A. SPERRY.